United States Patent
Xiong

(10) Patent No.: US 10,168,559 B2
(45) Date of Patent: Jan. 1, 2019

(54) LIQUID CRYSTAL DISPLAY DETECTING SYSTEM AND A METHOD THEREOF

(71) Applicant: Shenzhen China Star Optoelectronics Technology Co., Ltd., Shenzhen, Guangdong (CN)

(72) Inventor: Zhi Xiong, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 240 days.

(21) Appl. No.: 15/103,886

(22) PCT Filed: May 24, 2016

(86) PCT No.: PCT/CN2016/083078
§ 371 (c)(1),
(2) Date: Jun. 13, 2016

(87) PCT Pub. No.: WO2017/181474
PCT Pub. Date: Oct. 26, 2017

(65) Prior Publication Data
US 2018/0101034 A1 Apr. 12, 2018

(30) Foreign Application Priority Data
Apr. 19, 2016 (CN) .......................... 2016 1 0244926

(51) Int. Cl.
*G06F 1/00* (2006.01)
*G02F 1/133* (2006.01)
(Continued)

(52) U.S. Cl.
CPC .............. *G02F 1/133* (2013.01); *G09G 3/00* (2013.01); *G09G 3/2096* (2013.01); *G09G 3/36* (2013.01);
(Continued)

(58) Field of Classification Search
CPC ......... G06F 1/00; G06F 2101/00; G09G 1/00; G09G 2230/00; G05B 1/00; G05B 2219/00
See application file for complete search history.

(56) References Cited

U.S. PATENT DOCUMENTS

2010/0085336 A1\* 4/2010 Yang .................... G09G 3/3688
345/205
2011/0037758 A1 2/2011 Kim
(Continued)

FOREIGN PATENT DOCUMENTS

CN 101101738 A 1/2008
CN 101751890 A 6/2010
(Continued)

*Primary Examiner* — Jermele M Hollington
*Assistant Examiner* — Temilade Rhodes-Vivour
(74) *Attorney, Agent, or Firm* — Andrew C. Cheng

(57) ABSTRACT

The present invention provides an LCD detecting system including timing control (TCON) IC. The TCON IC includes a process unit to receive lock signal, a detecting control unit connected with the process unit, and a point-to-point transmission unit connected with the detecting control unit. The detecting control unit detects mode of the point-to-point transmission unit and sends a control signal to the process unit based on a detecting result. The TCON IC transmits timing control signal based on the control signal received by the process unit and starts to transmit normal RGB data. Priority of the control signal transmitted by the detecting control unit is higher than that of the lock signal. The present invention also provides an LCD detecting method. The present invention can increase the speed of detecting and time to market, enhance competitiveness, increase the speed of manufacturing analysis, saves working time and productivity, and reduces cost.

10 Claims, 6 Drawing Sheets

(51) Int. Cl.
*G09G 3/36* (2006.01)
*G09G 3/00* (2006.01)
*G09G 3/20* (2006.01)
*G09G 5/00* (2006.01)
*G09G 5/18* (2006.01)
*G09G 1/00* (2006.01)

(52) U.S. Cl.
CPC ............... *G09G 5/006* (2013.01); *G09G 5/18* (2013.01); *G05B 2219/00* (2013.01); *G06F 2101/00* (2013.01); *G09G 1/00* (2013.01); *G09G 2310/0264* (2013.01); *G09G 2310/08* (2013.01); *G09G 2370/08* (2013.01)

(56) References Cited

U.S. PATENT DOCUMENTS

2011/0169582 A1* 7/2011 Kim .................... H03C 3/0916
                                                        331/1 R
2011/0216057 A1* 9/2011 Fan ........................ G06F 3/038
                                                        345/213
2011/0242088 A1* 10/2011 Kim .................... G09G 3/3611
                                                        345/214
2013/0050176 A1* 2/2013 Kim ........................ G09G 3/36
                                                        345/214
2015/0348479 A1* 12/2015 Kim .................... G09G 3/3406
                                                        345/204

FOREIGN PATENT DOCUMENTS

| CN | 101763832 A | 6/2010 |
| CN | 102214429 A | 10/2011 |
| CN | 103389455 A | 11/2013 |
| CN | 103854617 A | 11/2013 |
| CN | 103680378 A | 3/2014 |
| CN | 103794184 A | 5/2014 |
| CN | 103903577 A | 7/2014 |
| CN | 103928004 A | 7/2014 |

* cited by examiner

LIQUID CRYSTAL DISPLAY DETECTING SYSTEM AND A METHOD THEREOF

BACKGROUND

Technical Field

The present invention relates to displaying driver field, and more particularly, to liquid crystal display (LCD) detecting system based on a point-to-point transmission system and a method thereof.

Description of Related Art

A liquid crystal display (LCD) panel develops toward high resolution, high refresh rate, and high bits. Data transmitting between timing control (TCON) IC and driver IC is increased tremendously. Thus, the conventional mini-low voltage differential signal transmitting between TCON IC and driver IC cannot satisfy the application.

In the conventional art, high efficiency data signal is adopted to solve the conventional problem of catching wrong signal resulted from clock phase difference produced by separating clock signal and data signal. Adopting built-in clock signal usually can avoid phase difference and high efficiency data signal is usually transmitted point to point. Adopting built-in clock signal needs to transmit clock signal before transmitting normal displaying signal. Thus, the clock signal of the decoded data signal at the receiving end of driver IC is the same as the coded clock signal at the sending end of TCON IC.

Referring to FIG. 1, it shows time diagram of conventional point-to-point signal. The point-to-point signal between driver IC and TCON IC performs transmitting normal clock signal before normal displaying signal. When driver IC normally locks the clock signal, the lock signal of driver IC is at high level. When driver IC cannot normally lock the clock signal, the lock signal of driver IC is at low level. When TCON IC receives the clock signal of low level, clock training continues.

Referring to FIG. 2, the conventional panel topology usually connects one TCON IC with a plurality of driver ICs. Referring to FIG. 3, TCON IC performs clock training in phase I, transmits control signal in phase II, and transmits normal RGB data in phase III. If driver IC can receive clock training and normally lock clock signal, lock pin of driver IC is at high level and lock pin of TCON IC receives high level because of pull-up resistor. If driver IC cannot receive, or receives clock training but cannot normally lock clock signal, driver IC lowers the lock and lock pin of TCON IC receives low level. TCON IC continues clock training and cannot enter next phase.

During the detecting or manufacturing process of LCD, if one of driver ICs fails to receive or driver IC is damaged, entire LCD fails because TCON IC continues clock training. LCD fails so it cannot quickly confirm that TCON IC fails or driver IC fails. Even it can confirm that driver IC fails but cannot identify the failed driver IC. Thus, the complication of design is increasing and time for fail manufacturing analysis is increasing.

SUMMARY

To resolve the aforementioned problem, the present application provides an LCD detecting system and method thereof which avoid a status that entire LCD fails, increase the speed of detecting, and decrease the time of manufacturing analysis.

The present invention includes an LCD detecting system including timing control (TCON) IC. The TCON IC includes a process unit to receive lock signal, a detecting control unit connected with the process unit, and a point-to-point transmission unit connected with the detecting control unit. The detecting control unit detects mode of the point-to-point transmission unit and sends a control signal to the process unit based on a detecting result. The TCON IC transmits timing control signal based on the control signal received by the process unit and starts to transmit normal RGB data. Priority of the control signal transmitted by the detecting control unit is higher than that of the lock signal.

The detecting control unit is a timer. When TCON IC performs clock training, the timer times.

When the timer finds time of clock training is larger than predetermined time, the timer sends control signal of over the predetermined time to the process unit. When the process unit receives the over-time signal sent by the timer, it forces TCON IC to transmit timing control signal and normal RGB data.

The detecting control unit is a timer. When TCON IC performs clock training, the timer times.

When the timer finds time of clock training is larger than predetermined cycle, the timer sends control signal of over the predetermined cycle to the process unit. When the process unit receives the control signal sent by the timer, it forces TCON IC to transmit timing control signal and normal RGB data.

An LCD detecting method includes the following steps:

TCON IC performs clock training.

Judging whether all driver IC can normally lock clock signal. If driver IC can, the lock signal is at high level and it goes to next step.

TCON IC transmits timing control signal.

TCON IC transmits normal RGB data.

If driver IC cannot normally lock clock signal, it continues clock training. When time of clock training is larger than predetermined time or predetermined cycle, TCON IC does not process lock signal and transmits timing control signal and normal RGB data.

The benefit of the present invention is that it increases the speed of detecting and time to market, enhances competitiveness, increases the speed of manufacturing analysis, saves working time and productivity, and reduces cost.

BRIEF DESCRIPTION OF THE DRAWINGS

The accompanying drawings are included to provide easy understanding of the application, are incorporated herein and constitute a part of this specification. The drawings illustrate embodiments of the application and, together with the description, serve to illustrate the principles of the application.

DESCRIPTION OF THE PREFERRED EMBODIMENTS

To better and concisely explain the disclosure, the same name or the same reference number given or appeared in different paragraphs or figures along the specification should has the same or equivalent meanings while it is once defined anywhere of the disclosure.

Figure 1:
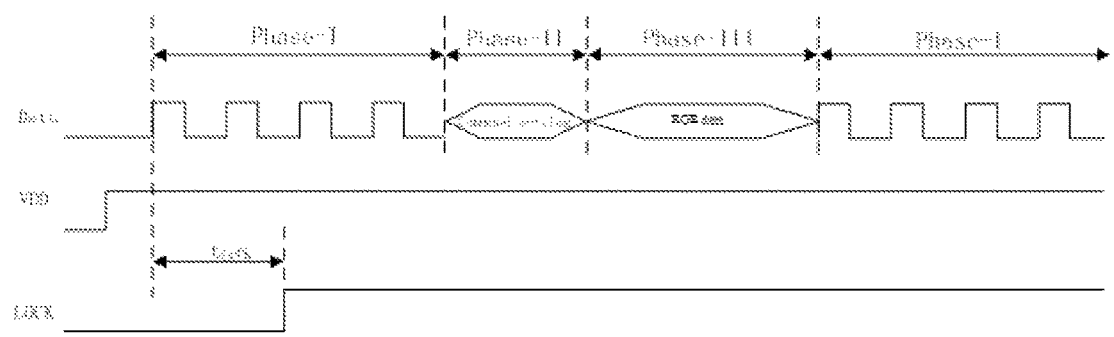
FIG. 1 is a conventional time diagram of point-to-point signal.
Figure 2:
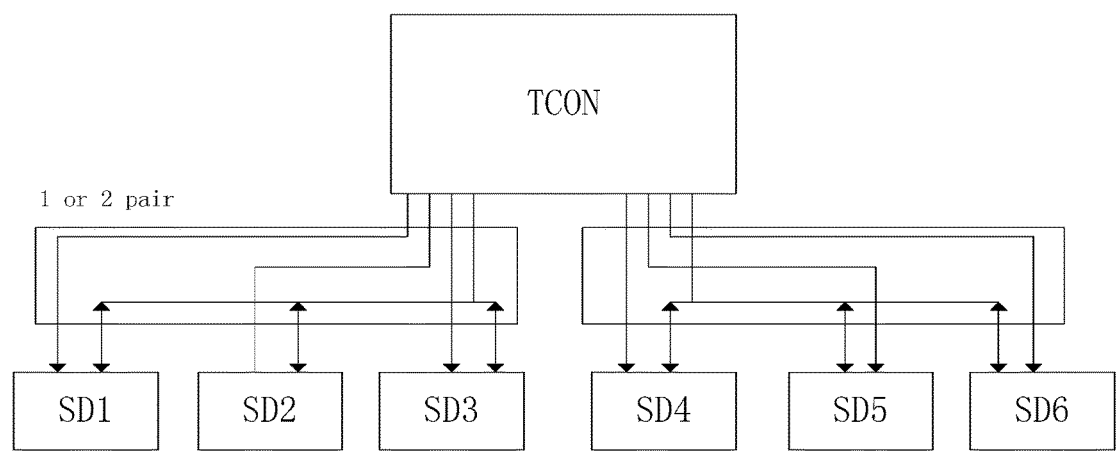
FIG. 2 is a schematic diagram of a conventional panel topology.
Figure 3:
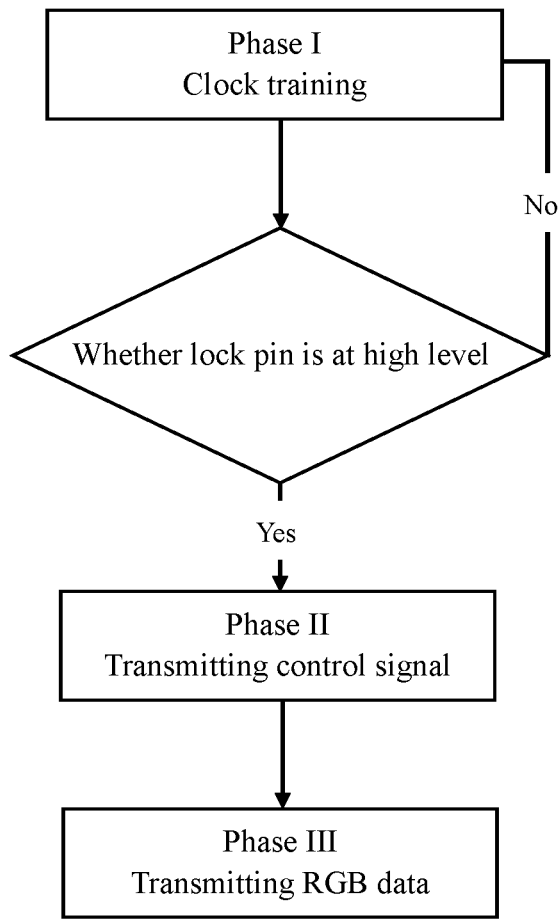
FIG. 3 is a flow chart of a point-to-point transmission of a conventional LCD.
Figure 4:
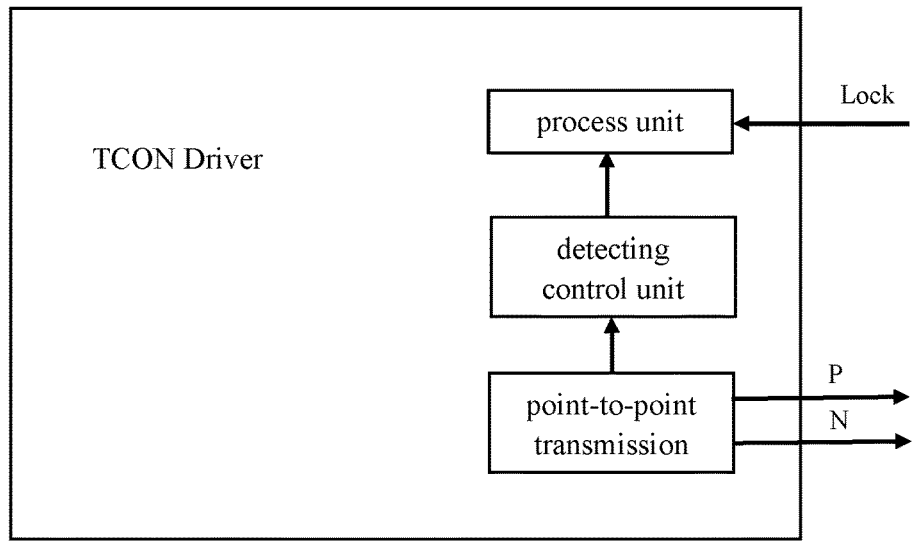
FIG. 4 is a schematic diagram of LCD detecting system in accordance with an embodiment of the present invention.

FIG. 4 is a schematic diagram of a liquid crystal display (LCD) detecting system in accordance with an embodiment of the present invention. The LCD detecting system includes timing control (TCON) IC. The TCON IC includes a process unit to receive lock signal, a detecting control unit connected with the process unit, and a point-to-point transmission unit connected with the detecting control unit.

The detecting control unit detects mode of the point-to-point transmission unit and sends a control signal to the process unit based on a detecting result. The TCON IC transmits timing control signal based on the control signal received by the process unit and starts to transmit normal RGB data. Priority of the control signal transmitted by the detecting control unit is higher than that of the lock signal.

Figure 5:
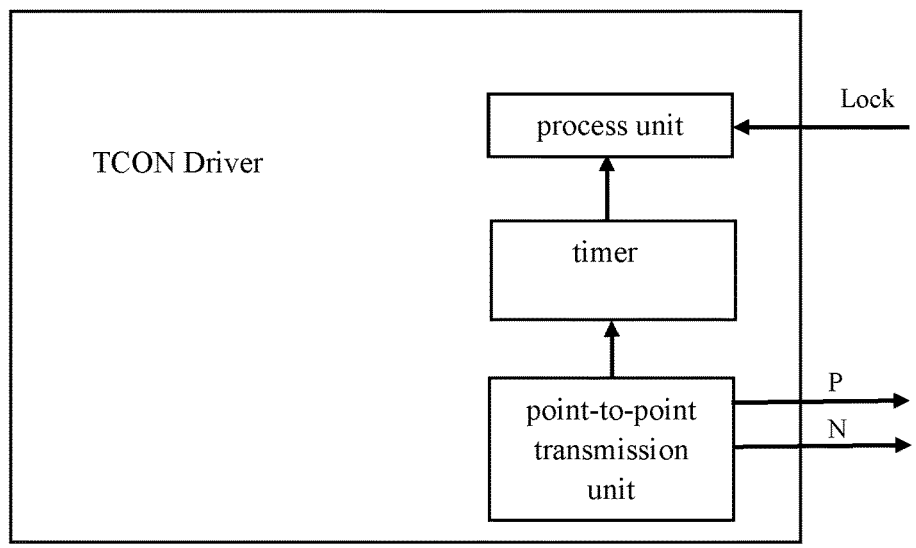
FIG. 5 is a schematic diagram of LCD detecting system in accordance with another embodiment of the present invention.

Referring to FIG. 5 which is a schematic diagram of LCD detecting system in accordance with an embodiment of the present invention, the detecting control unit is a timer detecting mode of the point-to-point transmission unit. When TCON IC enters phase I and performs clock training, the timer times. When the timer finds time of clock training is larger than predetermined time T, the timer sends control signal of over the predetermined time to the process unit. When the process unit receives the over-time signal sent by the timer, it forces TCON IC to enter phase II and phase III. That is, it transmits timing control signal and normal RGB data. Driver IC normally locking clock signal can normally receive the data signal sent by the TCON IC. LCD displays well except a region including the driver IC which cannot normally lock clock signal.

Figure 6:
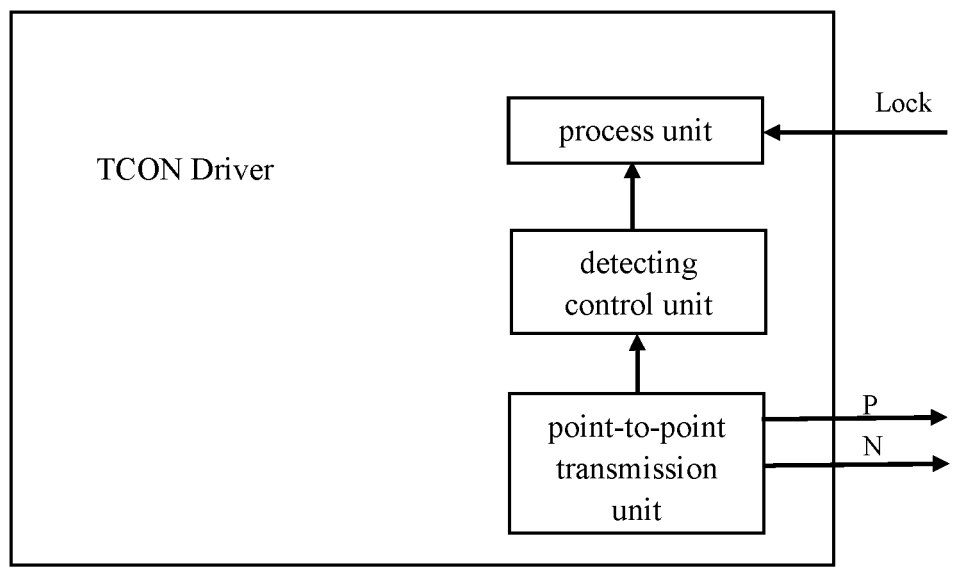
FIG. 6 is a schematic diagram of LCD detecting system in accordance with another embodiment of the present invention.

Referring to FIG. 6 which is a schematic diagram of LCD detecting system in accordance with another embodiment of the present invention, the detecting control unit is a timer detecting mode of the point-to-point transmission unit. When TCON IC enters phase I and performs clock training, the timer times. When the timer finds time of clock training is larger than predetermined cycle N, the timer sends control signal of over the predetermined cycle to the process unit. When the process unit receives the control signal sent by the timer, it forces TCON IC to enter phase II and phase III. That is, it transmits timing control signal and normal RGB data. Driver IC normally locking clock signal can normally receive the data signal sent by the TCON IC. LCD displays well except a region including the driver IC which cannot normally lock clock signal.

Figure 7:
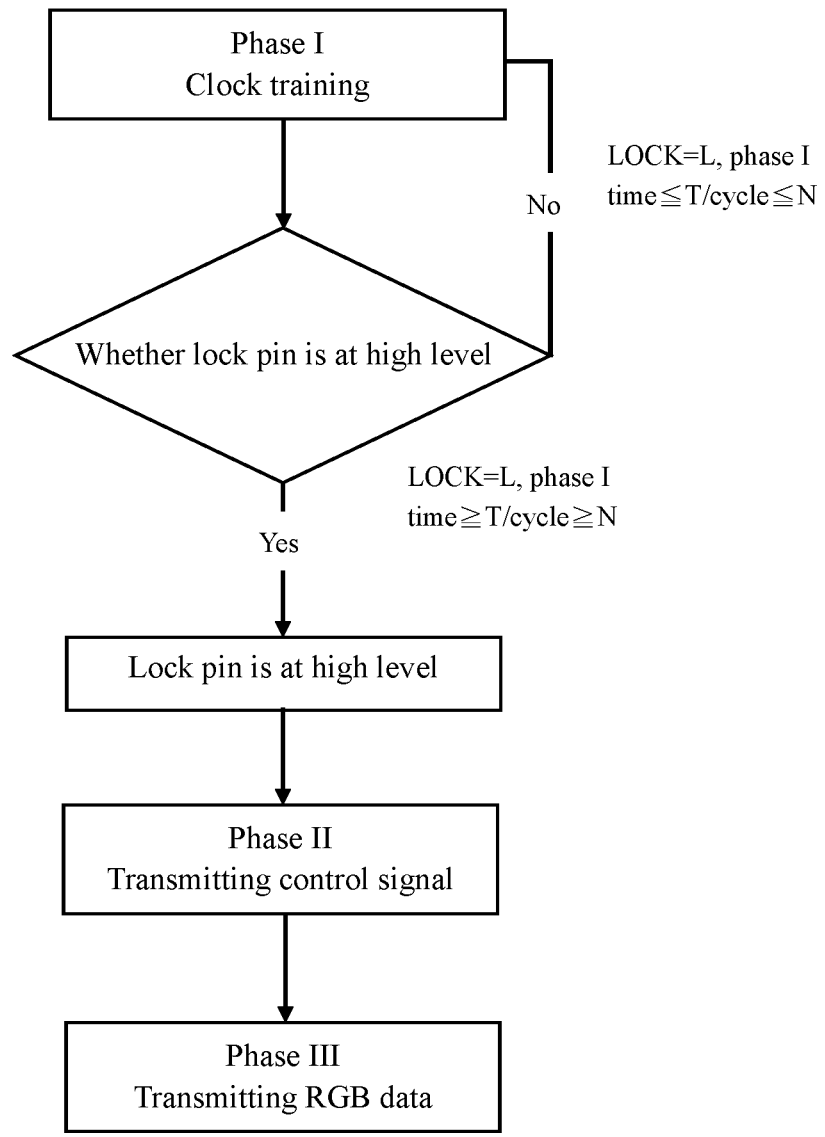
FIG. 7 is a flow chart of LCD detecting method in accordance with an embodiment of the present invention.

Referring to FIG. 7, FIG. 7 is a flow chart of LCD detecting method in accordance with an embodiment of the present invention. The LCD detecting method includes the following steps:

Step 1, TCON IC enters phase I and performs clock training.

Step 2, judging whether all driver ICs can normally lock clock signal. If driver IC can, the lock signal is at high level and it goes to next step. If driver IC cannot, it transfer to Step 1 and continues clock training. When time of clock training is larger than predetermined time T or predetermined cycle N, TCON IC does not process lock signal and goes to next step directly.

Step 3, TCON IC enters phase II and transmits timing control signal.

Step 4, TCON IC enters phase III and transmits normal RGB data.

The LCD detecting system and method thereof change the flow of point-to-point transmission and avoid a status that entire LCD fails. They increase the speed of detecting, decrease the time of manufacturing analysis, save working time and productivity, reduce cost, and enhance competitiveness.

It will be apparent to those having ordinary skill in the art that various modifications and variations can be made to the devices in accordance with the present disclosure without departing from the scope or spirit of the disclosure. In view of the foregoing, it is intended that the present disclosure covers modifications and variations of this disclosure provided they fall within the scope of the following claims and their equivalents.

What is claimed is:

1. A liquid crystal display (LCD) detecting system, comprising:
    a timing control (TCON) IC, comprising:
    a process unit to receive lock signal;
    a detecting control unit connected with the process unit; and
    a point-to-point transmission unit connected with the detecting control unit;
    wherein the detecting control unit detects mode of the point-to-point transmission unit to judge whether all driver ICs can normally lock clock signal accordingly, time of the TCON IC performing clock training is compared with a predetermined value to produce a detecting result, and sends a control signal to the process unit;
    wherein the process unit makes the TCON IC to transmit timing control signal based on the received control signal and starts to transmit normal RGB data to the LCD displaying unit;
    wherein priority of the control signal transmitted by the detecting control unit is higher than that of the lock signal;
    wherein the control signal is sent to the process unit when the detecting result indicating a timing parameter of clock training is larger than the predetermined value.

2. The LCD detecting system of claim 1, wherein the detecting control circuit is a timer, and the timer times when the TCON IC performs clock training.

3. The LCD detecting system of claim 2, wherein the timing parameter of clock training comprises time of clock training and when the timer finds time of clock training is larger than predetermined time, the timer sends control signal of over the predetermined time to the process unit, and when the process unit receives the over-time signal sent by the timer, it forces the TCON IC to transmit timing control signal and normal RGB data.

4. The LCD detecting system of claim 1, wherein the detecting control circuit is a timer, and the timer times when the TCON IC performs clock training.

5. The LCD detecting system of claim 4, wherein the timing parameter comprises cycle of clock training and when the timer finds cycle of clock training is larger than predetermined cycle, the timer sends control signal of over the predetermined cycle to the process unit, and when the process unit receives the over-time signal sent by the timer, it forces the TCON IC to transmit timing control signal and normal RGB data.

6. An LCD detecting method comprising:
performing clock training by a TCON IC;
judging whether all driver ICs can normally lock clock signal and sending a control signal to the process unit based on a detecting result that time of the TCON IC performing clock training is compared with a predetermined value;
transmitting timing control signal by the TCON IC; and
transmitting normal RGB data by the TCON IC;
wherein the control signal is sent to the process unit when the detecting result indicating a timing parameter of clock training is larger than the predetermined value.

7. The LCD detecting method of claim 6, wherein the detecting control unit is a timer, and the timer times when the TCON IC performs clock training.

8. The LCD detecting method of claim 7, wherein the timing parameter of clock training comprises time of clock training and when the timer finds time of clock training is larger than predetermined time, the timer sends control signal of over the predetermined time to the process unit, and when the process unit receives the over-time signal sent by the timer, it forces the TCON IC to transmit timing control signal and normal RGB data.

9. The LCD detecting method of claim 6, wherein the detecting control unit is a timer, and the timer times when the TCON IC performs clock training.

10. The LCD detecting method of claim 9, wherein the timing parameter comprises cycle of clock training and when the timer finds cycle of clock training of clock training is larger than predetermined cycle, the timer sends control signal of over the predetermined cycle to the process unit, and when the process unit receives the over-time signal sent by the timer, it forces the TCON IC to transmit timing control signal and normal RGB data.

* * * * *